Dec. 31, 1963  A. W. JOY  3,115,684
MULTIPLE MOBILE AUCTION ARENA
Filed June 8, 1962  3 Sheets-Sheet 1

Ardo W. Joy
INVENTOR.

BY *[signatures]*
Attorneys

Dec. 31, 1963   A. W. JOY   3,115,684
MULTIPLE MOBILE AUCTION ARENA
Filed June 8, 1962   3 Sheets-Sheet 2
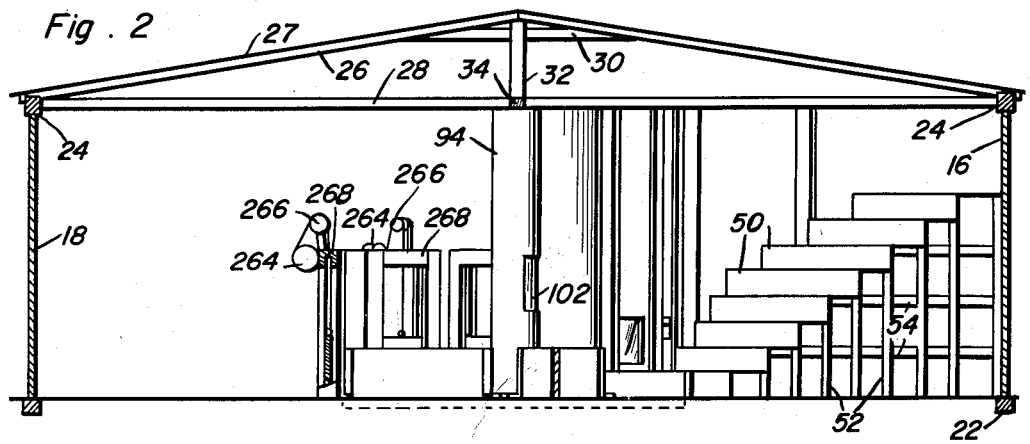
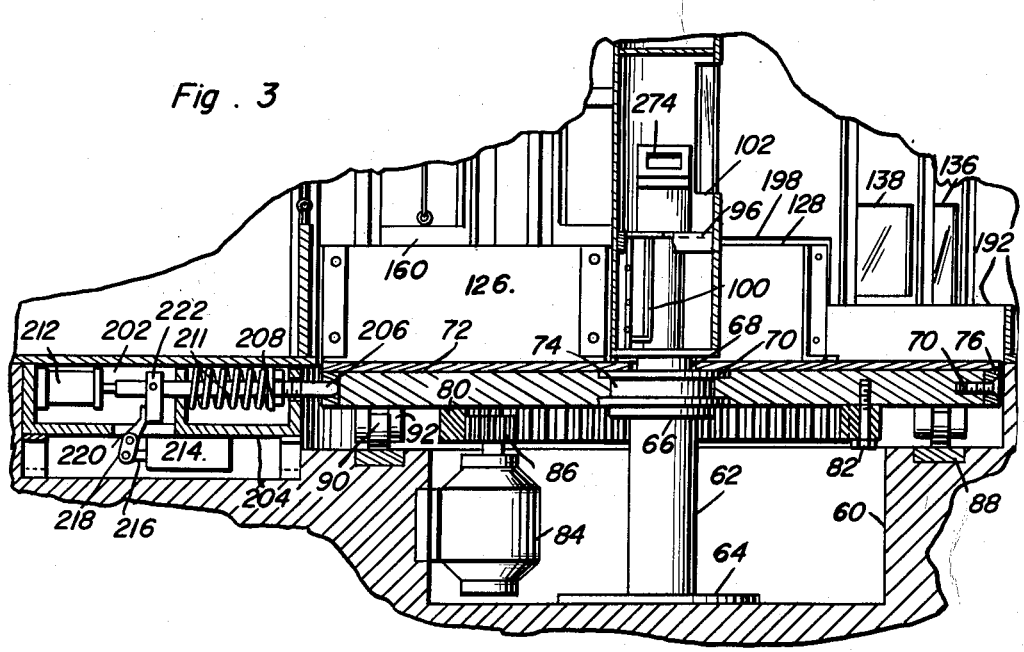
Ardo W. Joy
INVENTOR.
BY *Thomas A. O'Brien*
*and Harvey B. Jacobson*
Attorneys Dec. 31, 1963 A. W. JOY 3,115,684
MULTIPLE MOBILE AUCTION ARENA
Filed June 8, 1962 3 Sheets-Sheet 3

Ardo W. Joy
INVENTOR.

BY *[signatures]*
Attorneys

United States Patent Office 3,115,684
Patented Dec. 31, 1963

3,115,684
MULTIPLE MOBILE AUCTION ARENA
Ardo W. Joy, 3940 N. Sherman Drive,
Indianapolis 18, Ind.
Filed June 8, 1962, Ser. No. 201,132
12 Claims. (Cl. 20—1)

This invention relates to an auction arena, and particularly to an auction arena having a movable platform whereby the commodity being sold may be quickly and easily conveyed into and removed from the arena whenever desired.

Accordingly, it is a primary object of the invention to provide a novel conveying device for an auction arena adapted to quickly and easily convey the commodity being sold into and from the arena whenever desired.

More specifically, it is an object of the invention to provide a rotatable power driven platform in an auction arena whereby the platform may be rotated and stopped in an exact position whenever desired so that the commodity being auctioned may be quickly moved by the platform to and from the auction arena.

It is another object of the invention to provide a novel auction arena including a conveyor which is provided with a loading and weighing portion, a sales portion, and an unloading portion whereby the conveyor may be simultaneously loaded and unloaded and at the same time the sales portion of the conveyor may be exposed in an amphitheater for displaying a commodity being sold. The loading and unloading portions of the conveyor are concealed from the view of the buyers in the amphitheater. The three portions of the conveyor are substantially identical so that each portion thereof may be moved when desired to a new position to be used for a different purpose. For example, after the commodity has been sold, the conveyor is moved so that the sales portion then becomes the unloading portion, the unloading portion then becomes a loading portion and the loading portion then becomes a sales portion.

It is another object of the invention to provide a device which will save considerable time and expense in conducting auction sales.

It is another object of the invention to provide an auction arena that is particularly adapted for the sale of animals such as cattle and permits the animals to be quickly and easily displayed to the prospective buyers and quickly removed after they have been sold.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a vertical cross-sectional view taken substantially on the plane of line 2—2 in FIGURE 1;

FIGURE 3 is an enlarged vertical cross-sectional view taken through the axis of the rotatable arena;

Figure 1:
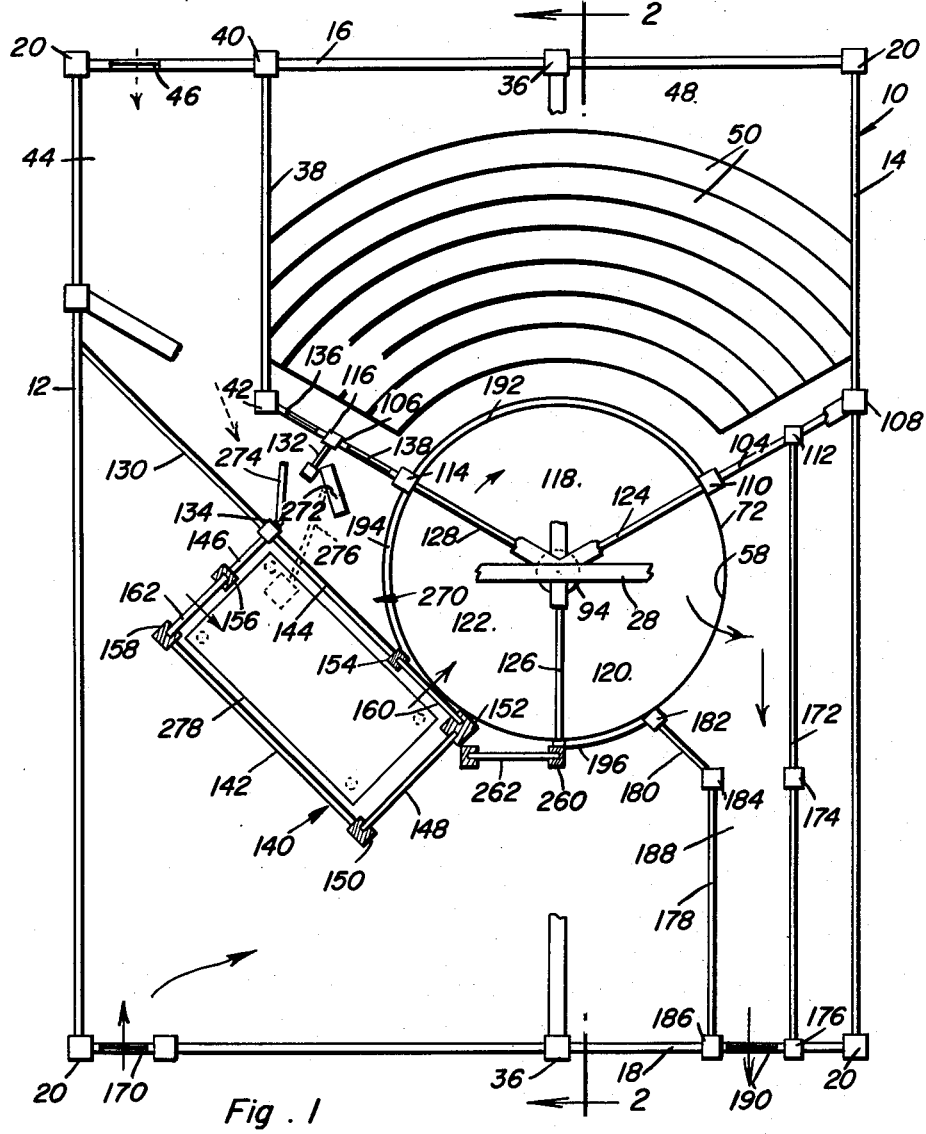
FIGURE 1 is a plan view of the invention shown installed in a building with its roof removed.

One or more of the auction arenas comprising this invention may be installed within a stockyard which may contain several acres of pens, alleys, offices, and other equipment for handling livestock. The entire arena may be under one roof or it may be only partially covered. The arena does not require a separate building. An amphitheater including seats, buyers' rooms, rest rooms, etc. of various designs may be built around the arena. The arena could be installed in an automobile auction building, in a tobacco warehouse or any market place adjacent to an amphitheater or other accommodation for buyers or spectators. For purposes of illustrating one way of using the auction arena it is shown enclosed within a building 10 comprising parallel vertical side walls 12 and 14, a front wall 16 and a rear wall 18 all connected together at their adjacent ends to form a generally box-like structure. The ends of each of the walls are connected together by means of vertically extending corner posts 20. The bottom edges of the walls are supported on a rectangular foundation 22 of conventional construction. The upper edges of the outer walls 12, 14, 16 and 18 are capped by a rectangular sill construction comprising a plurality of sill plates or beams 24. The sill plates 24 on the side walls 16 and 18 are spanned by a plurality of equally spaced girders comprising rafters 26 and joists 28. The rafters and joists are reinforced by horizontal members 30 and vertical members 32 connected thereto. The centers of the trusses are connected by longitudinally extending beam 34 supported on its ends by vertical posts 36.

The front portion of the building is provided with an inside partition 38 connected at its ends to vertical posts 40 and 42, and spaced slightly from the side wall 12 so as to provide an entrance corridor 44 between the partition 38 and wall 12. A conventional entrance door 46 is mounted in the right side of the front wall 16 so as to provide a means for the public or prospective buyers to enter the building. A buyers' or public room 48 is defined by and between the walls 14 and 16 and the partition 38. A plurality of arcuate seats 50 are arranged in step-like fashion within the room 48 and are supported on a plurality of vertical studs 52 and horizontal beams 54 criss-crossing and connected to the studs.

The building 10 is provided with a floor 56 preferably composed of concrete. A cylindrical well 58 is provided of the width desired with 120 degrees of the perimeter wall extending above the surface 24 to support a railing 192 of the amphitheater. Below the well 58 is provided a cylindrical motor chamber 60 concentric with the well. The walls of the well and motor chamber are also preferably formed of concrete.

A cylindrical post 62 extends vertically through the centers of the well and motor chamber, and the bottom of the post is provided with a circular flange 64 which is secured to the bottom of the motor chamber.

The upper end of the post 62 has an annular thrust bearing flange 66 secured therearound. The portion of the post extending above the flange 66 is of reduced diameter as shown at 68. An annular bearing ring 70 is rotatably supported on the flange 66 and the reduced end 68 of the post.

A circular platform 72 has a central bore therethrough which receives the bearing ring 70. The outer periphery of the bearing ring has a U-shaped groove therein which receives an annular flange 74 of the platform 72. The outer periphery of the platform 72 is enclosed by an annular reinforcing ring 76 secured to the outer edges of the platform by conventional means such as by screws 78.

A ring gear 80 is secured to the underside of the platform 72 concentric therewith as by threaded studs 82. A conventional electric motor 84 is mounted to the vertical side wall of the motor chamber 60 and has a vertically extending drive shaft provided with a pinion 86 in driving engagement with the teeth on the inner surface of the ring gear 80.

The bottom of the well 58 is provided with a circular track 88 of U-shaped cross-section concentric with the post 62. A plurality of rollers or wheels 90 are pivotally and rotatably mounted on horizontal axes to the underside of the platform 72 by means of downwardly projecting ears 92.

A hollow cylindrical auctioneer's chamber 94 is secured to the upper end of the post extension 68 in concentric relationship with the post and the circular platform 72. Alternatively, the auctioneer's chamber could be supported on the floor of the amphitheater by a truss structure, not shown and the platform 72 could be supported on post 62 in a manner different than illustrated. The inside of the auctioneer's chamber 94 is provided with a horizontal floor 96 spaced about 24" (optional) above the upper end of the post 62. A small entrance opening is provided in the bottom of the chamber 94 for gaining access thereto and a small ladder 100 with a handrail leads from adjacent the entrance up to a small opening or trapdoor in the floor 96. A rectangular opening 102 facing the seats 50 is provided in chamber 94 several feet above the floor 96.

A pair of partitions 104 and 106 extend from the auctioneer's chamber 94 to the posts 108 and 42 respectively. Partitions 104 and 106 include vertical posts 110, 112, 114 and 116. The partitions 104 and 106 form an angle therebetween of 120°.

The platform 72 has its upper surface divided into three equal sector shaped areas 118, 120 and 122 by three radially extending walls 124, 126 and 128. Each of the walls is spaced 120° apart and extend from the auctioneer's chamber 94 to the outer periphery of the platform.

The rear end of the corridor 44 is defined by a pair of vertically extending partitions 130 and 132 which extend between the side wall 12 and a post 134 and between the post 134 and the post 116 respectively.

The partition 106 is provided with a conventional door 136 to provide communication between the corridor 44 and the buyers' room 48. The partition is provided with a window 138.

The rear half of the building 10 may comprise a loading and unloading area for loading and unloading livestock onto the platform 72. A rectangular weighing and loading pen 140 is provided on one side of the building and comprises fence sections 142, 144 and 146 connected to posts 150, 152, 154, 134, 156 and 158. The posts 152 and 154 and the posts 156 and 158 are provided with vertical grooves which receive vertically slidable gates 160 and 162. A door 148 is vertically slidably mounted between posts 150 and 152. The doors for pen 152 may be mounted on hinges if desired. The scale could be mounted on the opposite side of the building. A conventional door 170 is provided in the rear wall 18 for entrance into building 10 and access to weighing and loading pen 140. A fence 172 including the post 174 is connected between the posts 112 and 176 parallel to the wall 14. Fences 178 and 180 extend between the posts 182, 184 and 186. An outlet corridor 188 is provided between the fence 172 and the fences 180 and 178. An outlet door 190 is provided in the partition 18 communicating with the corridor 188.

Arcuate railings 192, 194 and 196 are provided around portions of the peripheries of the well 58 and platform 72. The rails 192, 194 and 196 extend between the posts 114—110, 114—154, and 260—182 respectively. A by-pass door 262 is pivotally mounted on post 260 for gaining access to platform 72 without using weighing pen 140. The weigher's pen is defined by partitions 106, 132, 144 and 134. A scale dial 272 is mounted in the weigher's pen and faces window 138 so that it may be viewed by people in room 48 as well as the weigher. An entrance door for pen 270 is hinged to post 134. Dial 272 is operatively connected by means 276 to a scale mechanism supporting a scale platform 278.

As shown in FIGURE 3, the partitions 104 and 106 are provided with rectangular apertures 198 for permitting passage of the walls 124, 126 and 128 of the platform 120 when the platform is rotated about its central axis.

The gates 160 and 148 may be elevated by means of ropes or cables 260 connected to the drive shafts of electric motors 264 and extending over pulleys 266 supported on horizontal beams 268. Motors 264 are controlled by switches in the weigher's pen 270.

Although the auction arena has been illustrated and described as located in a specific building structure, it is to be understood that any suitable building may be used or the arena may even be used in the open.

In operation, the prospective buyers gain access to the seats 50 by means of the doors 46 and 136 and the corridor 44 or by other suitable means. The auctioneer enters the auctioneer's chamber by means of the entrance opening 98, stands on the floor 96 and faces the buyers through the opening 102. The livestock to be sold are driven into the weighing loading chamber 140 by means of the entrance door 170, and the door 148. After the livestock have been contained in the chamber of pen 140 and weighed by the weigher in pen 270, they may be forced onto the loading area 122 of the platform 72 after the weigher has operated a switch to open the gate 160. After the livestock to be sold are on the loading area, the gate 160 is closed and when the sale is ready to be commenced, the platform is rotated 120° whereby the loading area 122 then becomes the sales area directly in front of the seats 50 and the auctioneer's stand. During the sale of the livestock, additional livestock may be loaded onto the area 120, and after the sale of the livestock on the area 122, the platform is again rotated 120° whereupon the area 122 is exposed to the delivery alley 188 and the sold livestock may be removed from the building by means of the corridor 188. While the livestock are being unloaded from the area 122, the livestock on the area 120 may be sold and the area 118 may be loaded with fresh livestock to be sold. Of course, this process may be repeated indefinitely merely by rotating the platform 72 in a clockwise direction in increments of 120° while the selling, loading, weighing and unloading is taking place. Since the selling, weighing, loading and unloading is taking place all simultaneously, it is apparent that considerable time is being saved. Also, the buyers and auctioneer have an excellent view of the livestock for sale, and the buyers, consignors and spectators are comfortably seated during the sale.

Figure 4:
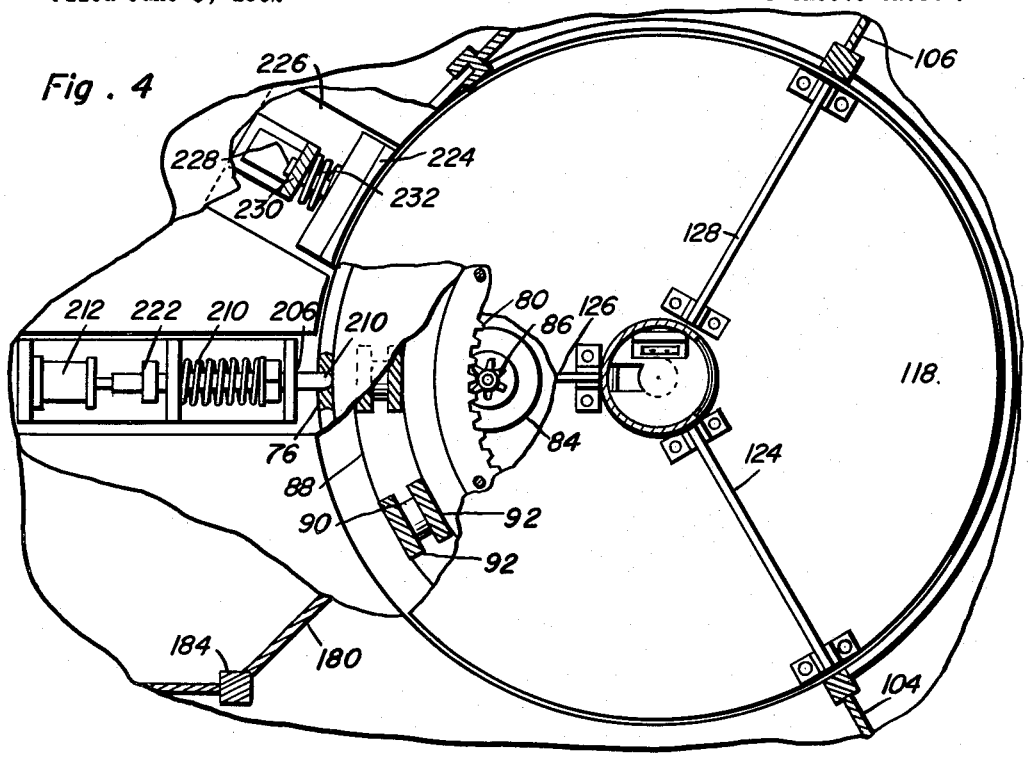
FIGURE 4 is a plan view of the rotatable arena with portions thereof broken away.
Figure 5:
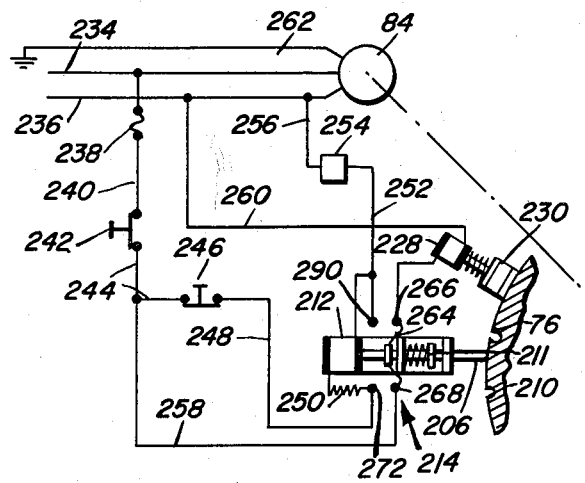
FIGURE 5 is a schematic diagram of the electrical controls for moving and stopping the rotatable area.

FIGURES 3, 4, and 5 illustrate a suitable power operated mechanism for rotating the platform 72 in increments of 120°. A radially extending recess 202 is provided in the floor of the building and in communication with one edge of the well 58. A U-shaped bracket 204 is provided in the recess 202 and has upstanding flanges with bores therein which slidably guide a plunger 206. The inner end of the plunger 206 is threaded and provided with a nut 208 thereon which serves as an abutment for a coil compression spring 211 compressed between the outer end of the bracket 204 and the nut 208 so as to urge the plunger into engagement with the outer periphery of the ring 76. Ring 76 is provided with three notches 210 spaced 120° apart. The outer end of the plunger 206 is connected to a plunger operating solenoid 212. A limit switch 214 is connected to the underside of the bracket 204 and has an operating plunger 216 pivotally connected to one end of an operating lever 218 which in turn is pivotally connected to the floor of the building 10 by a pivot pin 220. The upper end of the lever 218 contacts the outer surface of a flange 222 secured to the plunger 206.

As shown in FIGURE 4, a conventional brakeshoe 224 having an arcuate friction surface is radially slidably mounted adjacent the outer periphery of the ring 76 in a recess 226 in the floor of the building 10. The brakeshoe is secured to a rod 228 slidable within a bore in an L-shaped bracket 230 secured to the bottom of the recess 226. A coil spring 232 is connected between the shoe 224 and the bracket 230 in tension so as to normally tend to retract the shoe away from the ring 76.

FIGURE 5 illustrates schematically the electrical circuit for operating the various components of the auction arena. Power input lines 234 and 236 are connected to fuse 238 and motor 84 respectively. Fuse 238 is connected to the plunger operating solenoid 212 by means of line 240, operating switch 242, line 244, emergency cut-off switch 246, line 248 and resistor 250. The other side of the solenoid 212 is connected to the motor 84 by means of line 252, time switch 254 and line 256. The line 244 is connected to the brake operating solenoid 228 by means of a line 258 and limit switch 214. The other side of the solenoid 228 is connected to the input powerline 236 by means of a line 260. The housing of the motor 84 is grounded by a line or conductor 262. Limit switch 214 is illustrated schematically as comprising a pair of resilient arms 264 having their inner ends connected together and to the plunger 206, but insulated from the plunger. The arms are composed of highly conductive resilient metal and have their outer ends formed to a circular or semi-circular shape. As shown in FIGURE 5, the outer ends of the resilient arms 264 are in engagement with two contact points 266 and 268 so as to supply current through the solenoid 228. The switch also includes a pair of diametrically opposed contacts 270 and 290 spaced from the contacts 266 and 268. The switches 242 and 246 may be mounted on a control panel 274 within the auctioneer's chamber 94 as shown in FIGURE 3.

Normally when the platform 72 is in the position shown in FIGURES 1 and 4, the plunger 206 is in one of the recesses 210 for locking the platform in a stationary position as shown. To rotate the platform 120° in a clockwise direction, it is only necessary for the operator to momentarily depress the push button switch 242. Since the emergency switch 246 is normally closed, current is conducted from switch 242 to the solenoid 212 by means of the lines 244 and 248, the switch 246 and the resistor 250. The other side of the coil 212 is connected to the power input line 236 by means of the line 252, time switch 254, line 256, and motor 84. When the solenoid 212 is energized, it retracts the plunger 206 from the recess 210 and engages the resilient arms 264 between the contacts 272 and 290 so as to supply a heavy current to the motor 84 whereby the motor rotates the platform 72 by means of the gears 86 and 80. After the platform has rotated about 90°, the time switch 254 automatically breaks the circuit between the lines 252 and 256 thereby cutting off the motor. The switch 254 also de-energizes the solenoid 212 whereupon the spring 211 urges the plunger 206 into engagement with the outer surface of the ring 76 as shown in FIGURE 5. In this position, the resilient arms 264 connect the contacts 266 and 268 for energizing the brake solenoid 228 whereupon the solenoid forces the brakeshoe 230 into engagement with the outer surface of the ring 76 for gradually slowing down or braking the rotation of the platform. When the rotation of the platform is substantially reduced, the platform has been moved to an angle of 120° whereupon the spring 211 forces the plunger 206 into the next adjacent recess 210 for positively stopping and holding the platform in its proper position. When the plunger moves into the next recess 210, the arms 264 are moved inwardly away from the contacts 266 and 268 and thereby de-energizing the brake. In emergencies, the operation of the platform may be stopped merely by pressing in the push button of the emergency switch 246.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An auction arena comprising a support for an auctioneer, conveying means comprising a platform rotatable about a fixed post for moving a commodity to be sold in front of said support, the auctioneer's support being secured to the upper end of said post, a loading area and an unloading area remote from the front of said support and adjacent said conveying means, control means for moving said conveying means whereby said conveying means may be loaded with said commodity at said loading area, moved in front of said auctioneer's support for sale of said commodity, and moved to said unloading area for unloading said commodity.

2. An arena defined in claim 1 wherein said platform comprises an endless member which repeatedly moves through an endless path whereby said platform may be simultaneously loaded and unloaded.

3. A device as defined in claim 1 including motor means for moving said platform, control means for said motor means on said auctioneer's support.

4. An arena as defined in claim 1 wherein said conveying means moves over a predetermined path.

5. An arena as defined in claim 4 wherein said auction arena is provided with a support for people in front of the auctioneer's support, said platform passing between the supports.

6. An arena as defined in claim 5 wherein said arena and support for people comprise an amphitheater.

7. An arena as defined in claim 5 wherein said loading area includes scale means for weighing said commodity.

8. A device as defined in claim 5 wherein the people's support comprises a plurality of seats.

9. A device as defined in claim 8 wherein said platform is circular.

10. A device as defined in claim 9 including brake means for stopping movement of said platform, means for operating said brake means on said auctioneer's support.

11. An auction arena comprising a support for an auctioneer, conveying means for moving a commodity to be sold in front of said support, a loading area and an unloading area remote from the front of said support and adjacent said conveying means, control means for moving said conveying means over a predetermined path whereby said conveying means may be loaded with said commodity at said loading area, moved in front of said auctioneer's support for sale of said commodity, and moved to said unloading area for unloading said commodity, said conveying means comprising a circular platform rotatable about a fixed post which extends through said platform, said auction arena further being provided with a plurality of seats for supporting people in front of the auctioneer's support and said platform passing between the supports, the auctioneer's support being secured to the upper end of said post.

12. An auction arena comprising a support for an auctioneer, conveying means for moving a commodity to be sold in front of said support, a loading area and an unloading area remote from the front of said support and adjacent said conveying means, control means for moving said conveying means over a predetermined path whereby said conveying means may be loaded with said commodity at said loading area, moved in front of said auctioneer's support for sale of said commodity, and moved to said unloading area for unloading said commodity, said conveying means comprising a circular platform rotatable about a fixed post which extends through said platform, said auction arena further being provided with a plurality of seats for supporting people in front of the auctioneer's support and said platform passing between the supports, the auctioneer's support being secured to the upper end of said post, said platform being divided by radial partition means into three equal areas, said loading and unloading areas and the people's support being spaced substantially 120° around the axis of said platform.

References Cited in the file of this patent

UNITED STATES PATENTS

| | | |
|---|---|---|
| 721,767 | Wood | Mar. 3, 1903 |
| 2,037,815 | Ora | Apr. 21, 1936 |
| 2,317,438 | Bradley | Apr. 27, 1943 |
| 2,723,728 | Crawford | Nov. 15, 1955 |
| 2,764,783 | Teller | Oct. 2, 1956 |
| 2,823,425 | Granek | Feb. 18, 1958 |
| 2,871,984 | Colman | Feb. 3, 1959 |